Jan. 5, 1954  R. A. GRAY, JR  2,664,846
LIQUID LINE INDICATOR
Filed Nov. 27, 1951
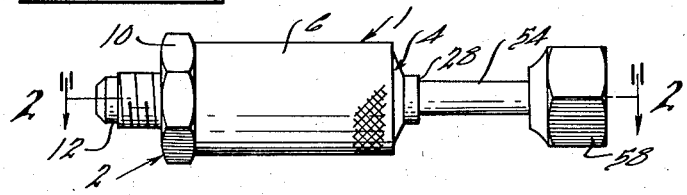
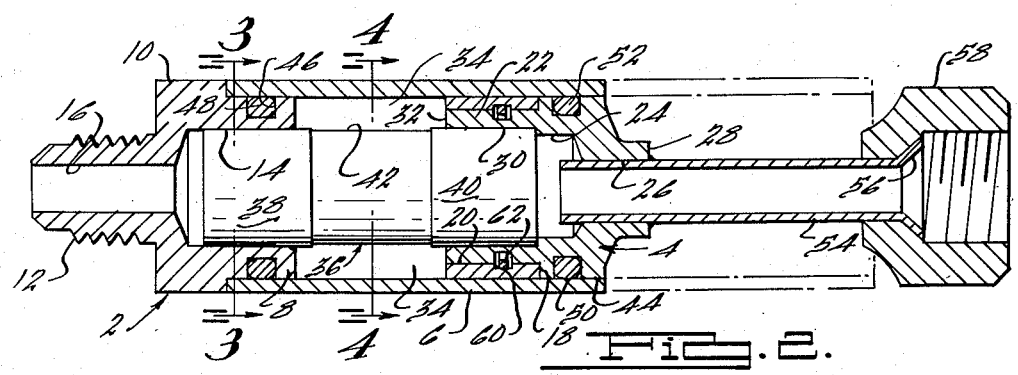
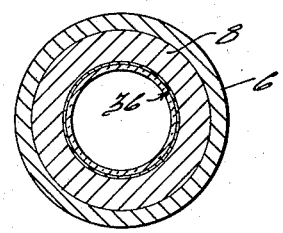
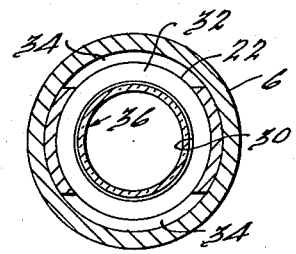
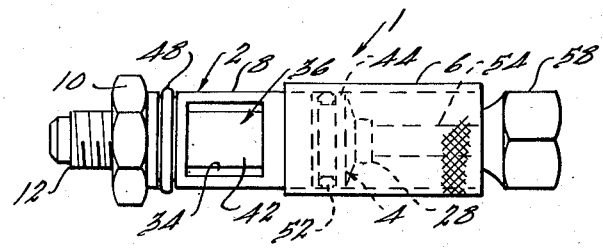
INVENTOR.
Robert A. Gray, Jr.
BY
Harness, Dickey & Pierce.
ATTORNEYS.

Patented Jan. 5, 1954

2,664,846

UNITED STATES PATENT OFFICE 2,664,846

LIQUID LINE INDICATOR

Robert A. Gray, Jr., Port Huron, Mich., assignor to Mueller Brass Company, Port Huron, Mich., a corporation of Michigan Application November 27, 1951, Serial No. 258,409

7 Claims. (Cl. 116—117)

This invention relates generally to sight glasses or indicators and more particularly to such an indicator which is particularly adapted for use in a refrigerant liquid line.

An object of this invention is to provide a new and improved liquid line indicator of the character described.

Another object of this invention is to provide such an indicator in which provision is made to compensate for the unequal expansion and contraction of the various materials which comprise the indicator.

A further object of this invention is to provide such an indicator which will retard, if not entirely prevent, the escape of refrigerant in the event of the rupturing of the transparent material used in the indicator.

Another object of this invention is to provide means for preventing accidental injury to the transparent portion of the indicator during periods when it is not desired to view the fluid flowing through the indicator.

Other objects of this invention will be apparent from the specification, the appended claims and the drawings, in which drawing:

Figure 1 is a view of the indicator embodying the invention;

Fig. 2 is a view taken substantially along the lines of 2—2 of Fig. 1;

Fig. 3 is a view taken substantially along the lines of 3—3 of Fig. 2;

Fig. 4 is a view taken substantially along the lines of 4—4 of Fig. 2; and,

Fig. 5 is a view similar to Fig. 1 but showing the protecting body portion moved outwardly to permit viewing of the fluid flowing through the indicator.

Referring to the drawings by character reference the numeral 1 indicates generally an indicator which is arranged to be inserted in a fluid conduit so that the fluid in the conduit may be observed. The indicator may be used for observing many different types of fluids and for purposes of illustration it will be described in connection with a liquid line of a refrigerating system but such description should be taken as illustrative rather than limitative since it will be apparent that it is equally adapted for conduits containing other fluids. The indicator 1 comprises a first body 2, a second body 4, and a sleeve 6 which is arranged for sliding movement with respect to the bodies 2 and 4. The body 2 comprises a cylindrical portion 8 having an enlarged portion 10, which may be hexagonal in cross section, adjacent one end portion thereof which is adapted for receiving a wrench or other tool whereby its male fitting 12 may be screwed to a suitable mating fitting on conduit (not shown). The male fitting 12 extends outwardly of the hexagonal portion 10. The body 2 is provided with a chamber 14 which is preferably circular in cross section which is in communication with a smaller diameter passageway 16 extending through the male fitting 12. The portion 20 of the chamber 14 adjacent the inner end 18 of the body 2 is of a larger diameter and receives a reduced diameter cylindrical end portion 22 of the body 4.

The body 4 is provided with a chamber 24 having a reduced diameter portion 26 opening outwardly through the outer end 28 of the body 4 and having a slightly larger diameter portion 30 opening outwardly through the inner end 32 of the body 4. The normal diameters of the chamber 14 and of the chamber portion 30 of the body 4 are substantially equal and are aligned to receive opposite end portions of a short piece of transparent tube 36, which preferably is glass. One or more portions of the side walls of the cylindrical portion 8 of the body 2 are cut away to provide openings 34 which permit the viewing of a fluid within the tube 36 through an intermediate side wall portion 42.

The body 4 has a portion 44 which is of the same external size as the portion 8 of the body 2 whereby the sleeve 6 may be slid along the bodies to cover the aperture 34. Preferably the portion 8 of the body 2 is provided with the peripheral slot 46 which receives an O-type sealing ring 48 which, with the sleeve 6 in the position shown in Figs. 1 and 2, acts to prevent fluid flow between the body 2 and the sleeve 6. Similarly the portion 44 of the body 4 is provided with a peripheral aperture 50 which receives another O-type sealing ring 52 for preventing flow of fluid between the sleeve 6 and the body 4. In order that the diameter of the indicator 1 may be made as small as possible and the sleeve 6 arranged to slide longitudinally with respect to the bodies 2 and 4 to expose the tube 36 to external view, a short section of tubing 54 is secured within the chamber portion 26 of the body 4 and extends outwardly from the body 4 a distance sufficient to permit sliding movement of the sleeve 6 longitudinally of the bodies 2 and 4. The far end of the tube 54 may be provided with a flared end 56 and flare nut 58 for securing the tube 54 to the conduit section of a refrigerant or other fluid system.

The transparent tube 36 is preferably glass and may be of the type in which its opposite end portions are covered with a metallic material so that these ends may be soft soldered into the bodies 2 and 4. Normally the strength of the glass tube 36 is sufficient under normal expected pressures in the fluid system to hold the body portions 2 and 4 in the desired relative position. The telescopically arranged portions of the bodies 2 and 4 are provided with aligned annular grooves 60 in which is positioned a snap ring 62. As will be apparent from the drawings, the width of the snap ring 62 is less than the width of the annular aperture 60 so that normally the positioning of the body 4 with respect to the body 2 will be determined solely by the glass tube 36 and the bodies 2 and 4 may have limited relative movement to compensate for the differences in the coefficient of thermal expansion between the metal of the bodies and the glass tube 36. However, in event of rupture of the glass tube 36, and relative movement of the bodies 2 and 4, the snap ring 62 will engage the shoulders of the annular recess 60 and prevent outward movement of the body member 4 from the body 2. Preferably the thickness of the snap ring 62 is such that it may be received entirely within the portion of the annular recess 60 which is within the body 4 thereby permitting initial assembly. After assembly, the snap ring 62 has sufficient resilience to snap out and into the position shown in the drawing in which the body 4 is prevented from withdrawal outwardly of the body 2.

With the sleeve 6 in the position of Fig. 1, rupturing of the tube 36 will not result in a rapid loss of refrigerant and in many circumstances the sleeve 6 will fully seal the rifrigerant systems and no loss of refrigerant will result since the opening formed by the rupture will be sealed by the O-rings 48 and 52.

What is claimed and is desired to be secured by United States Letters Patent is as follows:

1. A fluid line indicator comprising first member having a passageway extending therethrough and having an end portion, said member having an aperture through a wall thereof opening into said passageway, a second member having a passageway and having an end portion, said end portions being constructed to be telescoped together, lost-motion locking means holding said telescoped end portions together and permitting limited relative movement therebetween, a transparent tubular member within said first member passageway having an intermediate portion viewable through said aperture, and means immovably securing and sealing one end portion of said tubular member to said first member and immovably securing and sealing the other end portion of said tubular member to said second member and spacing said first and second members to an intermediate position of said lost-motion means whereby the distance between said first and second members throughout the range of said lost-motion means by any change in length of said tubular member is determined solely by said transparent member.

2. The combination of claim 1 in which a cover member is provided, said cover member being movable relative to said first and second members into and out of a position covering said aperture.

3. The combination of claim 2 in which sealing means is provided, said sealing means being cooperable with said cover member to prevent escape of fluid outwardly of said aperture in the event of a rupture of said tubular member.

4. A fluid line indicator comprising a first elongated body having means adapted for securing one end of said body to a fluid conveying conduit, said body having an elongated second portion with a cylindrical outer surface, said body having an internal bore extending therethrough and opening outwardly of the end of said body opposite to said one end, said bore having a normal diameter portion spaced from said opposite end and an enlarged diameter portion opening outwardly of said opposite end, a transparent tubular member within said bore and having a first end portion immovably secured and sealed to said normal diameter bore portion and a second end portion extending toward said body opposite end, a second body having a first portion with a cylindrical outer surface, said portion being telescoped within said enlarged bore portion, lost-motion locking means holding said bodies against more than a predetermined amount of relative movement there between, means immovably securing and sealing a second portion of said tubular member to said second body, said first body having an aperture opening through said elongated second portion and into said first body bore whereby a portion of said tubular member intermediate said tubular member first and second portions may be viewed.

5. The combination of claim 4 in which a cylindrical sleeve is provided, said sleeve being movable relative to said bodies into and out of a position covering said aperture, and in which means is provided for sealing said sleeve to said bodies to prevent fluid flow along said sleeve and outwardly of said bodies in the event of rupture of said tubular member.

6. A fluid line indicator for fluids subject to change in temperature comprising a first hollow elongated body, a second hollow body, said second body having a portion telescopically received within the hollow interior of said first body, lost-motion locking means holding said bodies within predetermined limits of relative movement, a glass tube within the hollow interior of said bodies, means immovably securing and sealing one end portion of said tube in fluid tight relation to said first body and another end portion of said tube in fluid tight relation to said second body, at least one of said bodies being apertured to permit the viewing of a portion of said tube intermediate said end portions from the exterior of said bodies, said tube end portions being so chosen that at normal room temperatures said tube acts to relatively position said bodies at an intermediate position of said lost-motion locking means.

7. The combination of claim 6 in which a sleeve is provided for movement relative to said bodies and movable into and out of a position in which said sleeve covers said body aperture whereby it is operable to protect said tube from accidental injury, and sealing means cooperable with said sleeve when said sleeve is in a position to cover said body aperture to prevent escape of fluid from said indicator in the event of rupture of said tube.

ROBERT A. GRAY, Jr.

References Cited in the file of this patent
UNITED STATES PATENTS

| Number | Name | Date |
|---|---|---|
| 738,503 | Waters | Sept. 8, 1903 |
| 1,910,752 | Coles | May 23, 1933 |
| 2,600,148 | Wittlin | June 10, 1952 |